United States Patent
Sato et al.

(10) Patent No.: US 8,145,258 B2
(45) Date of Patent: Mar. 27, 2012

(54) RADIO COMMUNICATION APPARATUS

(75) Inventors: Jin Sato, Beijing (CN); Kengo Onaka, Ishikawa-gun (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 223 days.

(21) Appl. No.: 12/555,892

(22) Filed: Sep. 9, 2009

(65) Prior Publication Data

US 2009/0325655 A1   Dec. 31, 2009

Related U.S. Application Data

(63) Continuation of application No. PCT/JP2008/050016, filed on Jan. 7, 2008.

(30) Foreign Application Priority Data

Apr. 13, 2007   (JP) ................................. 2007-105972

(51) Int. Cl.
  *H04M 1/00*   (2006.01)
  *H01R 13/648*   (2006.01)
  *H05K 1/14*   (2006.01)
  *H05K 7/00*   (2006.01)
  *H01P 1/203*   (2006.01)
  *H01B 12/00*   (2006.01)
  *H01L 39/24*   (2006.01)

(52) U.S. Cl. ............... 455/550.1; 455/575.3; 455/575.5; 455/575.7; 455/562.1; 505/210; 505/211; 439/607.02; 361/734; 361/746; 361/760

(58) Field of Classification Search .................. None
See application file for complete search history.

(56) References Cited

U.S. PATENT DOCUMENTS

| 2005/0075150 A1* | 4/2005 | Takagi et al. ............... 455/575.1 |
| 2006/0055609 A1 | 3/2006 | Harano |
| 2007/0105602 A1* | 5/2007 | Takebe ........................ 455/575.3 |

FOREIGN PATENT DOCUMENTS

| EP | 1 770 824 A1 | 4/2007 |
| EP | 1770824 A1 * | 4/2007 |
| JP | 06-037697 A | 2/1994 |

(Continued)

OTHER PUBLICATIONS

Thermoplastic Blends of ABS and PC for use in Portable Computer Housings, Author: Jonathan Oplotnik; Published May 10, 2004.*

(Continued)

*Primary Examiner* — Dwayne Bost
*Assistant Examiner* — Nalini Yerneni
(74) *Attorney, Agent, or Firm* — Keating & Bennett, LLP

(57) ABSTRACT

A radio communication apparatus includes housings that are connected via a hinge unit in an openable/closeable manner, and circuit boards in the housings. The circuit boards are connected via circuit connecting lines functioning as an inductor. One end of the hinge unit is connected to an end portion of the housing and the other end thereof is connected to a portion located farther inside than an end portion of the housing. When the housings are unfolded, a region extending from the portion to the end portion of the housing overlaps a region near the end portion of the housing in a projection domain. A high dielectric member is provided in this overlapped region, and a capacitor is constituted by the high dielectric member and ground areas.

7 Claims, 8 Drawing Sheets

FOREIGN PATENT DOCUMENTS

| | | |
|---|---|---|
| JP | 2004-040524 A | 2/2004 |
| JP | 2004-120578 A | 4/2004 |
| JP | 2005-167908 A | 6/2005 |
| JP | 2006-041899 A | 2/2006 |
| JP | 2006-054843 A | 2/2006 |
| JP | 2006-086715 A | 3/2006 |
| WO | 2005/053089 A1 | 6/2005 |

OTHER PUBLICATIONS

Official Communication issued in International Patent Application No. PCT/JP2008/050016, mailed on Feb. 12, 2008.

* cited by examiner

RADIO COMMUNICATION APPARATUS

BACKGROUND OF THE INVENTION

1. Field of the Invention

The present invention relates to a foldable radio communication apparatus which has a pair of housings in which a circuit board is housed.

2. Description of the Related Art

Radio communication apparatuses of this type have been employing a structure that enables conduction of an electric current, which is induced in a pair of circuit boards, to be improved and obtains an antenna gain as disclosed in, for example, Japanese Unexamined Patent Application Publication No. 2004-040524 and Japanese Unexamined Patent Application Publication No. 2006-086715.

FIG. 17 is a front view showing a radio communication apparatus according to a first related-art example. FIG. 18 is a perspective view showing a radio communication apparatus according to a second related-art example.

In a radio communication apparatus 100 disclosed in Japanese Unexamined Patent Application Publication No. 2004-040524, as shown in FIG. 17, ground units 111 and 121 of a pair of circuit boards 110 and 120 are connected via a resonant circuit 130. The resonant circuit 130 is a circuit in which a series-connected component and a resonance-use conductor 133 serving as an inductor are connected in parallel. In the series-connected component, a resonance-use conductor 131 serving as an inductor and a capacitor unit 132 are connected in series.

This causes a high-frequency electric current induced in the circuit board 110 by an antenna operation of an antenna 101 to flow to the circuit board 120 through the resonant circuit 130. An antenna gain is increased by making the conduction state of the high-frequency electric current be in a favorable state by using an impedance of the resonant circuit 130.

On the other hand, a radio communication apparatus disclosed in Japanese Unexamined Patent Application Publication No. 2006-086715, as shown in FIG. 18, has a structure in which a helical antenna 201 is provided at a front side of a conductor portion 210 of a circuit board and a flip element 230 is provided between the antenna 201 and the conductor portion 210. With such a structure, an electric current which flows into the flip element 230 from the conductor portion 210 is led using the flip element 230 in the direction opposite to the flow of the electric current in the conductor portion 210, and thus an antenna gain is increased.

However, existing radio communication apparatuses described above have the following problems.

First, in the radio communication apparatus shown in FIG. 17, the resonant circuit 130 includes the series-connected component in which the resonance-use conductor 131 serving as an inductor and the capacitor unit 132 are connected in series, and thus an electric current at the time of resonance always flows through both the resonance-use conductor 131 serving as an inductor and the capacitor unit 132. Thus, resonance is caused with an electric current having a desired frequency only if a condition regarding both the resonance-use conductor 131 serving as an inductor and the capacitor unit 132 is satisfied. Therefore, the impedance of the resonant circuit 130 can be controlled within only a specified and narrow range of frequency, and impedance control over a wide range of frequencies is difficult.

Next, the radio communication apparatus shown in FIG. 18 needs the helical antenna 201, which extends outside, and the flip element 230, whereby there is a problem that the physical volume of the radio communication apparatus becomes large.

SUMMARY OF THE INVENTION

In order to solve the above-described problems, preferred embodiments of the present invention provide a radio communication apparatus that can control an impedance between circuit boards over a wide range of frequencies and has a small physical volume.

According to a preferred embodiment of the present invention, a radio communication apparatus includes a first housing in which a first circuit board having an antenna unit is housed, a second housing in which a second circuit board is housed, a hinge unit arranged to connect the first housing and the second housing in an openable/closeable manner, a group of circuit connecting lines arranged to electrically connect a circuit of the first circuit board and a circuit of the second circuit board and to electrically connect a ground of the first circuit board and a ground of the second circuit board, and a high dielectric member provided near the hinge unit. The antenna unit is positioned near an end portion opposite the hinge unit of the first circuit board. The hinge unit connects an end portion of one housing from among the first and second housings and a portion of the other housing, the portion being located farther inside than an end portion of the other housing, and a region extending from the portion of the other housing to the end portion of the other housing overlaps a region near the end portion of the one housing in a projection domain when the first and second housings are in an unfolded state. The high dielectric member is arranged to be positioned between the regions overlapped when the first and the second housings are in an unfolded state in order to adjust a capacitance between the ground of the first circuit board and the ground of the second circuit board.

With such a structure, if an operation is performed in a state in which the first and second housings are unfolded, a radio wave is transmitted and received via the antenna unit of the first housing. Here, if electrical lengths of the first and the second circuits are appropriate electrical lengths corresponding to an electrical length of the antenna unit, an antenna gain is increased and antenna characteristics are improved. The electrical lengths of such first and second circuit boards can be adjusted by controlling an impedance of a parallel circuit in which the group of circuit connecting lines, which is used to connect the first and the second circuit boards and functions as an inductor, and a capacitor between the grounds are connected in parallel.

According to a preferred embodiment of the present invention, the region extending from the portion of the other housing to the end portion of the other housing overlaps the region near the end portion of the one housing in a projection domain in a state in which the first and second housings are unfolded, and the high dielectric member is arranged to be positioned between the regions overlapped. Thus, a capacitance of the parallel circuit depends on the dielectric constant of the high dielectric member. Therefore, if the lengths of the first and the second circuit boards are constrained in terms of design and a desired electrical length cannot be obtained, the electrical lengths of the first and the second circuit boards can be set to desired values by changing the impedance of the parallel circuit, more specifically, by adjusting the dielectric constant of the high dielectric member and changing the capacitance.

Here, the inductor constituted by the group of circuit connecting lines between the first and the second circuit boards and the capacitor between the grounds are connected in parallel. Thus, a high frequency electric current at the time of resonance can be caused to mainly flow through the capacitor by increasing the dielectric constant and by increasing the capacitance. Thus, even if a condition regarding both the group of circuit connecting lines and the capacitor is not satisfied as in the existing radio communication apparatus described above, a desired impedance can be obtained by just changing a condition regarding the capacitor, the condition being related to the high dielectric member. Thus, in a wide range of frequencies, an impedance between the first and the second circuit boards can be controlled.

In addition, the physical volume of such a radio communication apparatus can be reduced since the first circuit board including the antenna unit is housed in the first housing and unnecessary elements such as a flip element are not used.

The high dielectric member preferably is provided in at least one of the region extending from the portion of the other housing to the end portion of the other housing and the region near the end portion of the one housing.

The high dielectric member preferably defines a portion of or the entirety of at least one of the first and second housings.

With such a structure, the radio communication apparatus can be designed in a state in which the high dielectric is included, and thus the high dielectric does not affect the degree of freedom in designing of the radio communication apparatus.

The high dielectric member preferably is a mixture of a thermoplastic resin with a dielectric constant lower than that of a versatile plastic and filler with a high dielectric constant.

A dielectric constant of the high dielectric member preferably is set to a value within a range from 5 to 1000, for example.

With such a structure, since the high dielectric with a high dielectric constant ranging from 5 through 1000 can be arranged without increasing a thickness of or a volume of the high dielectric member, a demand in terms of a design in which thinning is achieved or protrusions are reduced can be met.

The high dielectric member preferably is provided in each of the region extending from the portion of the other housing to the end portion of the other housing and the region near the end portion of the one housing, and metal plates are arranged inside the respective high dielectric members that are paired and the metal plates face each other.

With such a structure, by adjusting the size of the metal plates, a capacitance between the first and the second circuit boards can be controlled.

Each of the metal plates preferably is electrically connected, via a metal line, to the ground of the circuit board inside a housing in which a high dielectric member having the metal plate is provided.

With such a structure, stronger capacitive coupling can be generated between the first and the second circuit boards.

According to various preferred embodiments of the present invention, since the impedance between the first and the second circuit boards can be controlled over a wide range of frequencies, even if the physical lengths of the first and the second circuit boards are constrained in terms of design, a favorable antenna gain can be obtained. Moreover, components projecting outside and unnecessary components are omitted as a result of, for example, the first circuit board including the antenna unit being housed in the first housing, thereby the physical volume of such a radio communication apparatus can be reduced.

Radio communication apparatuses that are far superior in terms of design are provided by preferred embodiments of the present invention.

In addition, according to a preferred embodiment of the present invention, since the capacitance between the first and the second circuit boards can be controlled by adjusting the size of the metal plates, control of a coupling amount between the first and the second circuit boards can be easily performed.

Furthermore, according to a preferred embodiment of the present invention, since stronger capacitive coupling can be generated between the first and the second circuit boards, even if an overlapped region of the metal plates that face each other is small, control of the capacitance between the first and the second circuit boards can assuredly be performed.

Other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

Preferred embodiments according to the present invention will be described with reference to the drawings.

Preferred Embodiment 1

Figure 1:
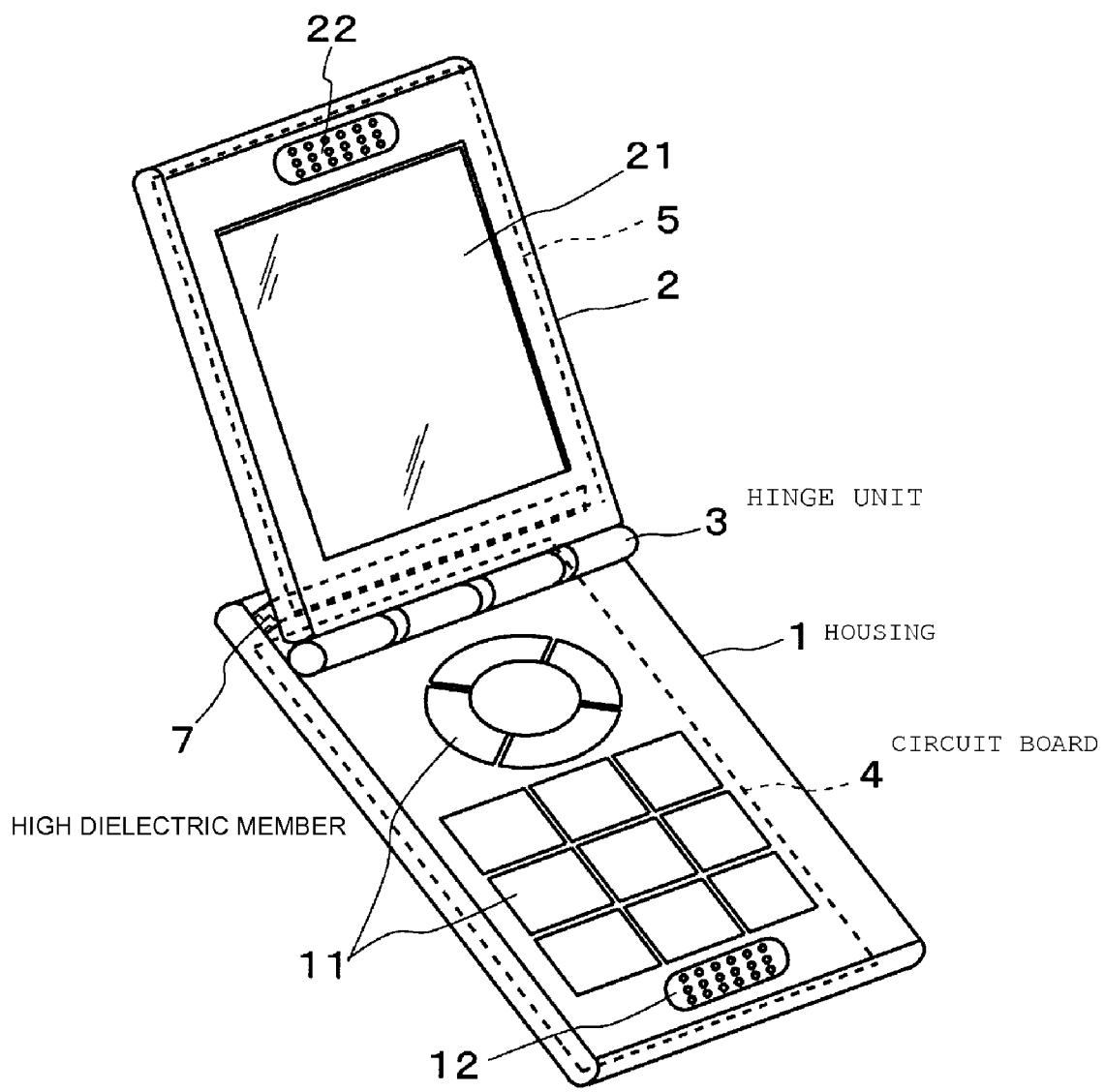
FIG. 1 is a perspective view showing a radio communication apparatus according to a first preferred embodiment of the present invention.
Figure 2:
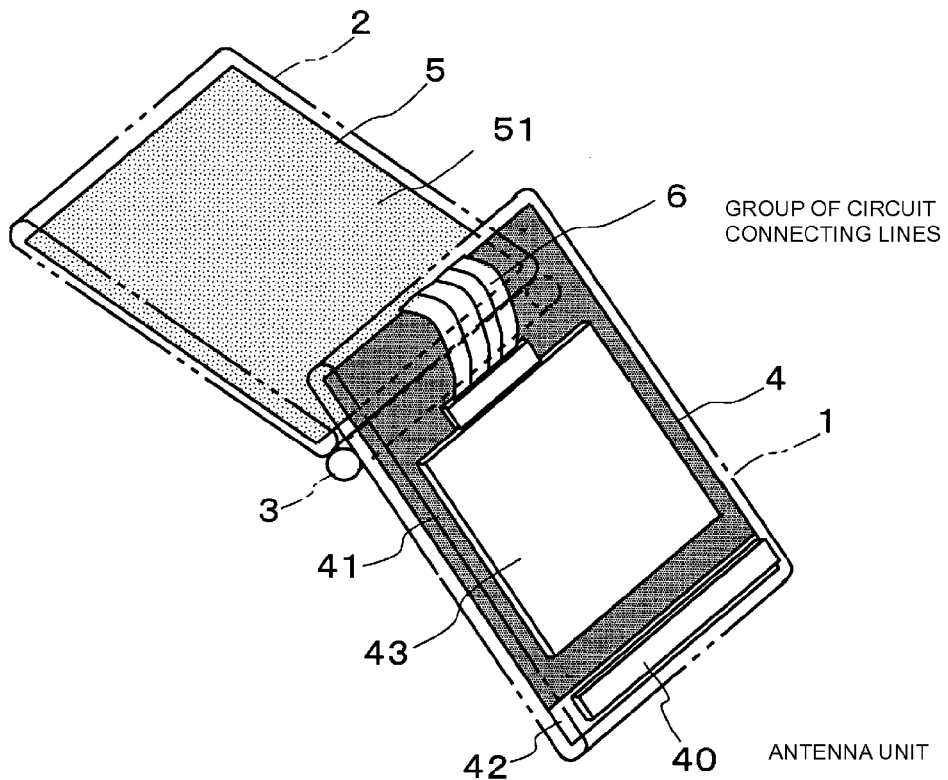
FIG. 2 is a perspective view of the radio communication apparatus shown in FIG. 1 in a case in which a circuit board is seen through from the back side.
Figure 3:
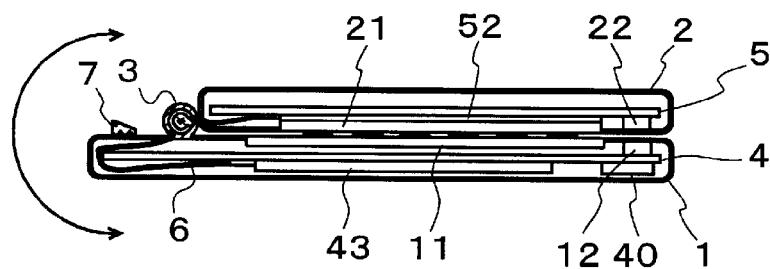
FIG. 3 is a sectional view of the radio communication apparatus which is in a folded state.
Figure 4:
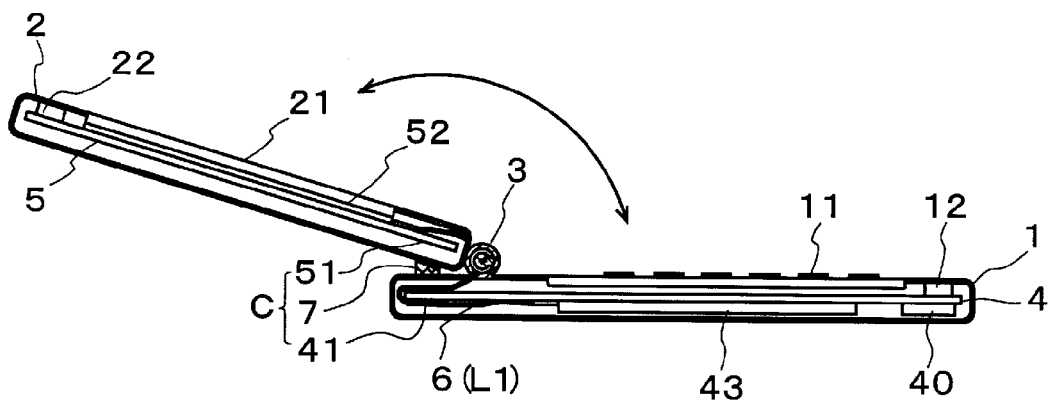
FIG. 4 is a sectional view of the radio communication apparatus which is in an unfolded state.

FIG. 1 is a perspective view showing a radio communication apparatus according to a first preferred embodiment of the present invention. FIG. 2 is a perspective view of the radio communication apparatus shown in FIG. 1 in a case in which a circuit board is seen through from the back side. FIG. 3 is a sectional view of the radio communication apparatus which is in a folded state. FIG. 4 is a sectional view of the radio communication apparatus which is in an unfolded state.

As shown in FIG. 1, the radio communication apparatus according to the first preferred embodiment is a foldable cellular telephone, for example. A housing 1 serving as a first housing and a housing 2 serving as a second housing are connected via a hinge unit 3 in an openable/closeable manner.

The housing 1 is a casing used as an operation unit of the radio communication apparatus, and is preferably formed of a synthetic resin such as a plastic.

A keyboard 11, a microphone 12, and the like preferably are mounted on the housing 1, and a circuit board 4 serving as a first circuit board is housed inside the housing 1 as shown by broken lines.

As shown in FIG. 2, the circuit board 4 has a ground area 41 on both surfaces thereof. A non-ground area 42 is provided at the back side of the circuit board 4, and an antenna unit 40 is surface-mounted on the non-ground area 42. Moreover, various circuits such as a transmitting-and-receiving unit and a control unit are provided on the ground area 41 of the circuit board 4; however, in order to facilitate understanding, these circuits are shown as a single circuit 43 on the drawings.

The antenna unit 40 preferably is a monopole antenna whose electrical length is $(\lambda/4) \times (m+1)$ and is electrically connected to the circuit 43. Here, $\lambda$ is a wavelength for a resonance frequency of the antenna unit 40 and m is an integer which is 0 or more.

On the other hand, the housing 2 is a casing used as a display unit of the radio communication apparatus, and is preferably formed of a synthetic resin such as a plastic, similarly to the housing 1. However, the housing 2 is designed to be longer than the housing 1. Here, in the first preferred embodiment, the housings 1 and 2 are preferably formed of a synthetic resin such as a plastic; however, these may be formed of a metal such as a magnesium alloy.

As shown in FIG. 1, a liquid crystal panel 21, a speaker 22, and the like are preferably mounted on the housing 2, and a circuit board 5 serving as a second circuit board is housed inside the housing 2 as shown by broken lines.

As shown in FIG. 2, the circuit board 5 has ground areas 51 and 51 on both surfaces thereof. Various circuits used to operate the liquid crystal panel 21, the speaker 22, and the like are provided on the ground area 51 at a front side of the circuit board 5; however, in order to facilitate understanding, these circuits are shown as a single circuit 52 as shown in FIG. 3.

As shown in FIG. 2, the circuit board 4 housed in the housing 1 and the circuit board 5 housed in the housing 2 are electrically connected via a group of circuit connecting lines 6.

A signal line and a control line that connect the circuit 43 to the circuit 52, a connecting line between the ground area 41 and the ground area 51, and the like exist in parallel between the circuit board 4 and the circuit board 5; however, in the first preferred embodiment, the signal line and the like are collectively shown as the group of circuit connecting lines 6.

As shown in FIG. 3, the group of circuit connecting lines 6 electrically connects the circuit board 4 to the circuit board 5 through the hinge unit 3. Thus, an inductor L1 constituted by the group of circuit connecting lines 6 is disposed between the circuit boards 4 and 5.

The hinge unit 3 is a portion that connects the housing 1 and the housing 2 in an openable/closeable manner, and, as a characteristic, links an end portion of the housing 2 serving as one housing to a portion located inside the housing 1 serving as the other housing.

Figure 5:
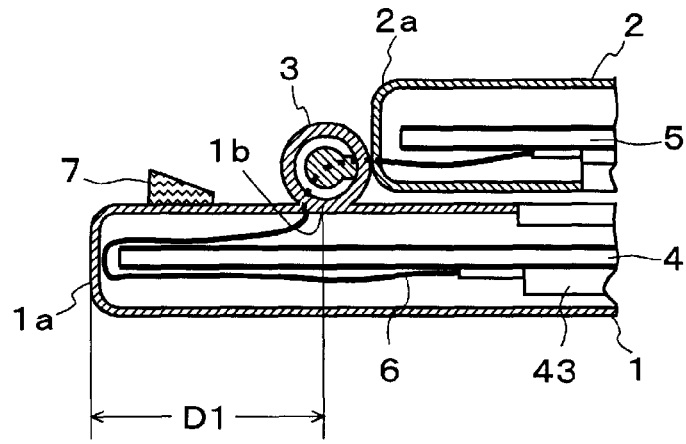
FIG. 5 is a partially enlarged sectional view used to describe a formation position of the hinge unit.
Figure 6:
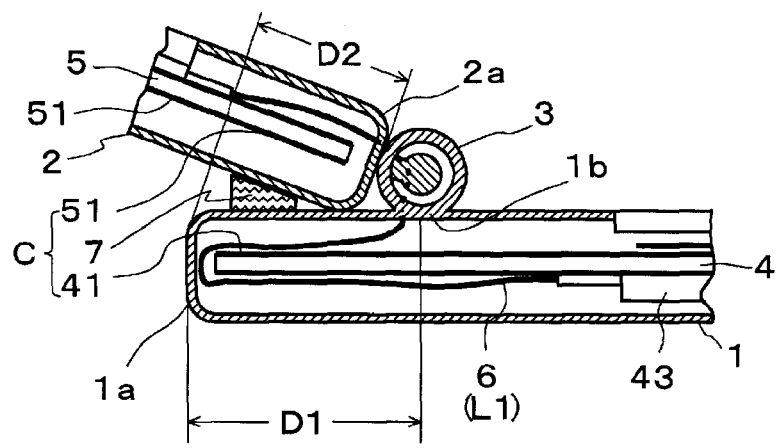
FIG. 6 is a partially enlarged sectional view used to describe an overlapped region of housings.

FIG. 5 is a partially enlarged sectional view used to describe a formation position of the hinge unit 3. FIG. 6 is a partially enlarged sectional view used to describe an overlapped region of the housings 1 and 2.

As shown in FIG. 5, one side of the hinge unit 3 is connected to an end portion 2a of the housing 2. The other side of the hinge unit 3 is connected to a portion 1b located farther inside (the right side of FIG. 5) than an end portion 1a of the housing 1.

This allows the housing 2 to rotate about the hinge unit 3 with respect to the housing 1, and as shown in FIG. 4, the housings 1 and 2 can be in an unfolded state.

Since the hinge unit 3 is connected to the portion 1b of the housing 1, when the housings 1 and 2 are in an unfolded state, as shown in FIG. 6, a region D1 extending from the portion 1b to the end portion 1a of the housing 1 and a region D2 near the end portion 2a of the housing 2 overlap with each other as seen in a projection domain.

A high dielectric member 7, which is characteristic according to the first preferred embodiment, is arranged at this overlapped region.

Figure 7:
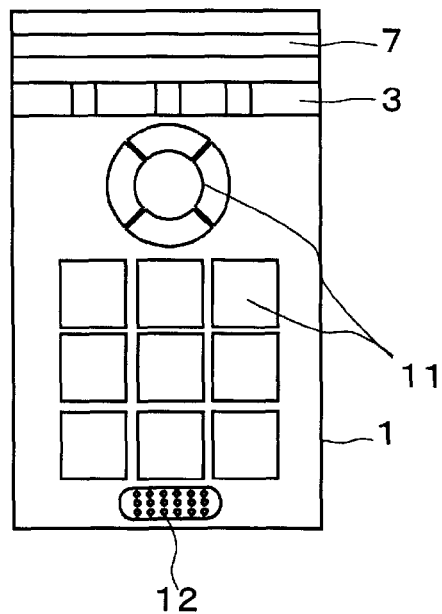
FIG. 7 is a plan view for indicating a position at which a high dielectric member is arranged.

FIG. 7 is a plan view for indicating a position at which the high dielectric member 7 is arranged.

As shown in FIG. 1, the high dielectric member 7 is a member arranged to adjust a capacitance between the ground areas 41 and 51 of the circuit board 4 and circuit board 5. In the first preferred embodiment, a thermoplastic resin, the dielectric constant of which is lower than that of versatile plastic such as PC (Polycarbonate) or a mixture of PC and ABS (Acrylnitrile Butadiene Styrene), and filler with a high dielectric constant are mixed, and the dielectric constant of the mixture is preferably 5 through 1000, for example.

The high dielectric member 7 is arranged so as to be positioned between the overlapped regions when the housings 1 and 2 are in an unfolded state as shown in FIG. 6. As shown in FIG. 5, the high dielectric member 7 is adhered onto the region D1 extending from the portion 1b of the housing 1 to the end portion 1a. The high dielectric member 7 may be adhered onto the region D2 near the end portion 2a of the housing 2.

Moreover, the high dielectric member 7 preferably has a strip-shaped configuration, a cross section of which has a trapezoid shape. As shown in FIG. 7, the high dielectric member 7 is adhered to the housing 1 across the entire width.

As shown in FIG. 6, when the housing 1 and 2 are unfolded, the high dielectric member 7 is disposed between the end portions of the housings 1 and 2, that is, between the end portions of the ground areas 41 and 51 of the circuit boards 4 and 5. A capacitor C is constituted by the ground areas 41 and 51 and the high dielectric member 7, and the capacitor C causes the circuit boards 4 and 5 to be in a state in which the circuit boards 4 and 5 are electrically connected.

Next, an operation of and advantages of the radio communication apparatus according to the first preferred embodiment will be described.

Figure 8:
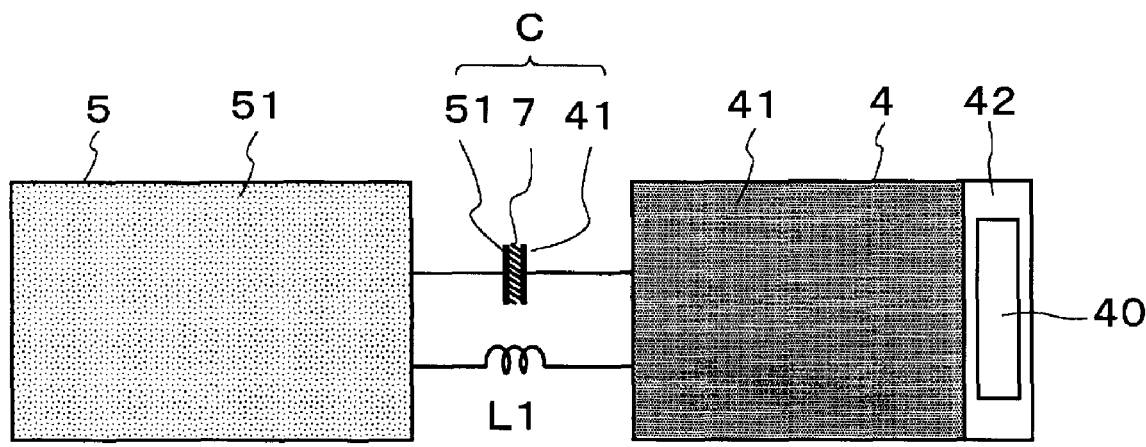
FIG. 8 is a schematic diagram showing a parallel circuit provided between circuit boards.
Figure 9A:
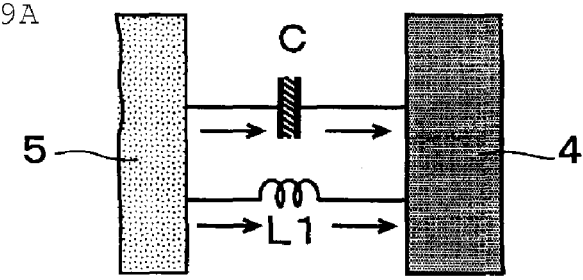
FIGS. 9A and 9B include schematic diagrams used to describe a function of the parallel circuit.
Figure 9B:
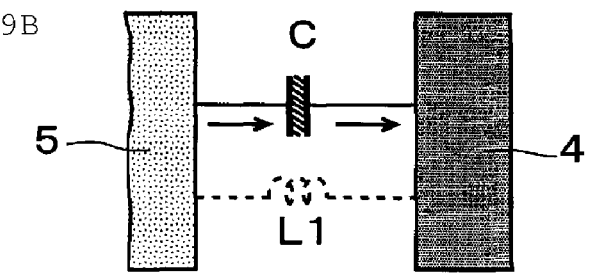

FIG. 8 is a schematic diagram showing a parallel circuit formed between the circuit boards. FIGS. 9A and 9B include schematic diagrams used to describe a function of the parallel circuit.

As shown in FIG. 1, if the circuit 43 is operated in a state in which the housings 1 and 2 of the radio communication apparatus are unfolded, a radio wave is transmitted and received via the antenna unit 40 of the housing 1.

Here, the antenna unit 40, the electric length of which is one fourth of the wavelength for a resonance frequency, preferably is a monopole antenna. Thus, if board lengths of the circuit boards 4 and 5 are appropriate lengths corresponding to the electric length of the antenna unit 40, an antenna gain is increased.

More particularly, when the electric lengths of the circuit boards 4 and 5 are equal to the electric length $(\lambda/4) \times (m+1)$ of the antenna unit 40 or longer than the electric length of the antenna unit 40 by about $0.1\lambda$, for example, an antenna gain is increased and antenna characteristics are improved.

Here, as described above, the circuit boards 4 and 5 are connected via the group of circuit connecting lines 6 serving as the inductor L1. Moreover, as shown in FIG. 6, since the circuit boards 4 and 5 are connected via the capacitor C constituted by the ground areas 41 and 51 and the high dielectric member 7 when the housings 1 and 2 are in an unfolded state, as shown in FIG. 8, the circuit boards 4 and 5 are in a state in which the circuit boards 4 and 5 are connected via the parallel circuit, which is constituted by the capacitor C and the inductor L1.

Thus, the board lengths of the circuit boards 4 and 5 can be adjusted to be appropriate values by controlling the impedance of this parallel circuit. That is, an electric length of the entirety of the circuit boards 4 and 5 can be adjusted by controlling the impedance of the parallel circuit.

In such a parallel circuit, as indicated by arrows shown in FIG. 9A, if the frequency of the electric current is high, the electric current flows through the capacitor C. If the frequency of the electric current is low, the electric current flows through the inductor L1. Thus, even if the same frequency is used, as shown in FIG. 9B, an influence caused by the inductor L1 can be disregarded by setting the capacitor C to have a high capacitance. Thus, in the first preferred embodiment, as described above, the impedance can be controlled in a manner such that the dielectric constant of the high dielectric member 7 is set to a value within a range from 5 to 1000, the capacitor C constituted by the high dielectric member 7 and the ground areas 41 and 51 of the circuit boards 4 and 5 is set to have a high capacitance, and the capacitor C can be seen as dominant. Thus, by setting the dielectric constant of the high dielectric member 7 to an appropriate value and causing the impedance of the parallel circuit to be small, the electrical length of the entirety of the circuit boards 4 and 5 can be adjusted to be an appropriate electrical length. Moreover, the impedance of the parallel circuit can be controlled by simply adjusting the capacitance of the capacitor C, which is adjusted by adjusting the dielectric constant of the high dielectric member 7. Thus, with respect to a wide range of frequencies, an appropriate electrical length, which is well-balanced, can be provided to the entirety of the circuit boards 4 and 5.

Figure 17:
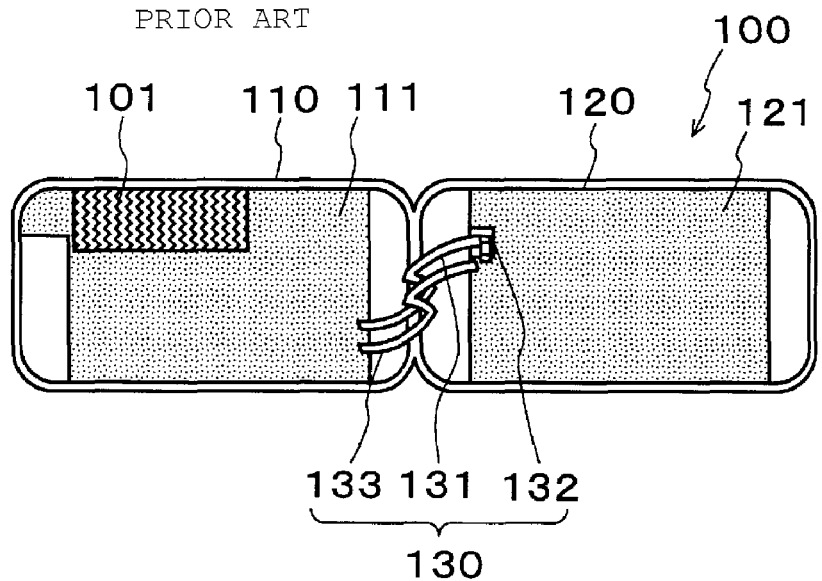
FIG. 17 is a front view showing a radio communication apparatus according to a first related-art example.
Figure 18:
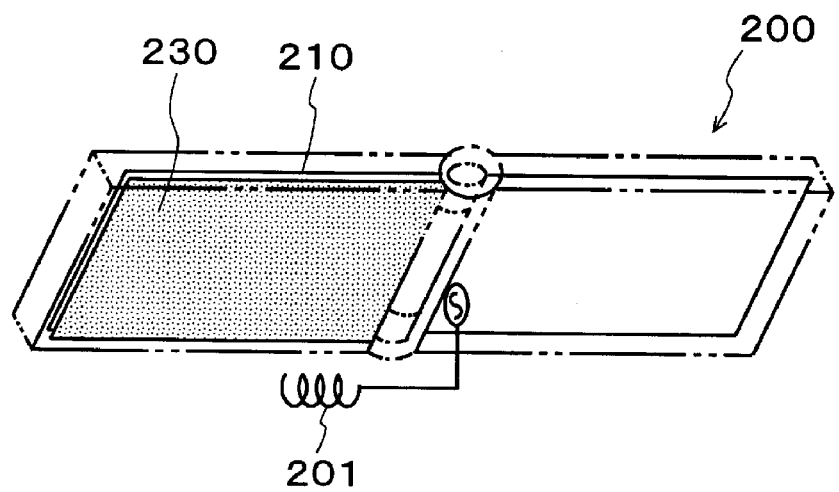
FIG. 18 is a perspective view showing a radio communication apparatus according to a second related-art example.

In contrast, similar to the radio communication apparatus shown in FIG. 17, if a parallel circuit which includes a series-connected component in which an inductor and a capacitor are connected in series is used, an appropriate electrical length cannot be provided to the entirety of the circuit boards 4 and 5 with respect to a wide range of frequencies.

Figure 10A:
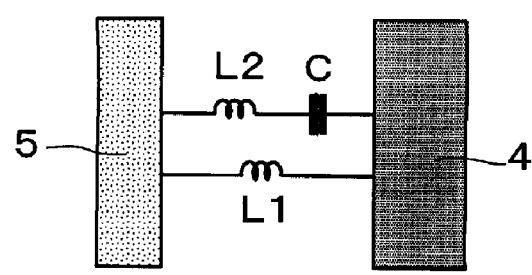
FIGS. 10A and 10B include schematic diagrams used to describe a disadvantage of an existing parallel circuit.
Figure 10B:
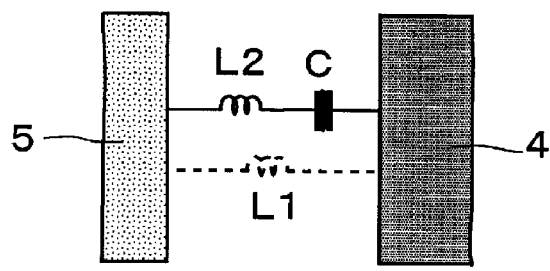

FIGS. 10A and 10B include schematic diagrams used to describe a disadvantage of an existing parallel circuit.

As shown in FIG. 10A, the existing radio communication apparatus shown in FIG. 17 has a structure in which a parallel circuit is provided between the circuit boards 4 and 5. In the parallel circuit, a series-connected component, in which an inductor L2 and the capacitor C are connected in series, and the inductor L1 are connected in parallel.

Thus, as shown in FIG. 10B, even if the capacitance of the capacitor C is adjusted in order to be able to disregard the inductor L1, since the inductor L2 and the capacitor C are connected in series, a desired impedance can be obtained only in a case in which a condition regarding the inductor L2 and capacitor C is satisfied. Therefore, outside a specified narrow range of frequencies, the electrical length of the entirety of the circuit boards 4 and 5 cannot be set to an appropriate value.

In contrast, the radio communication apparatus according to the first preferred embodiment differs from the existing radio communication apparatus. For a wide range of frequencies, in the radio communication apparatus according to the first preferred embodiment, the entirety of the circuit boards 4 and 5 can be set to have an appropriate electrical length. In addition, the physical volume of such a radio communication apparatus can be reduced since the circuit board 4 including the antenna unit 40 is housed in the housing 1 and unnecessary elements such as a flip element are not used.

Preferred Embodiment 2

Next, a second preferred embodiment of the present invention will be described.

Figure 11:
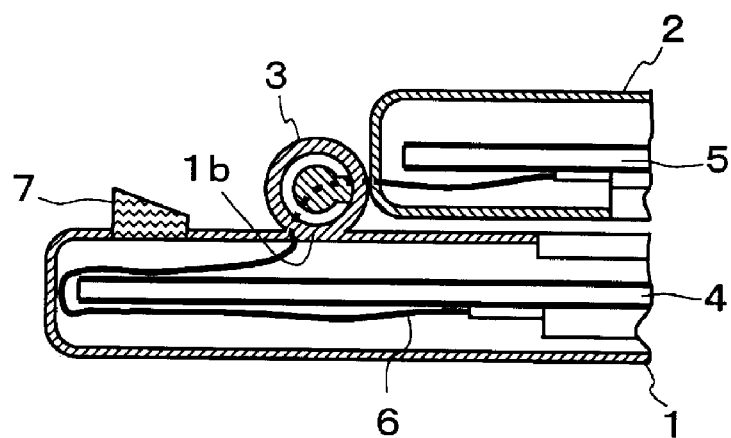
FIG. 11 is a partially enlarged sectional view showing a main portion of a radio communication apparatus according to a second preferred embodiment of the present invention.
Figure 12:
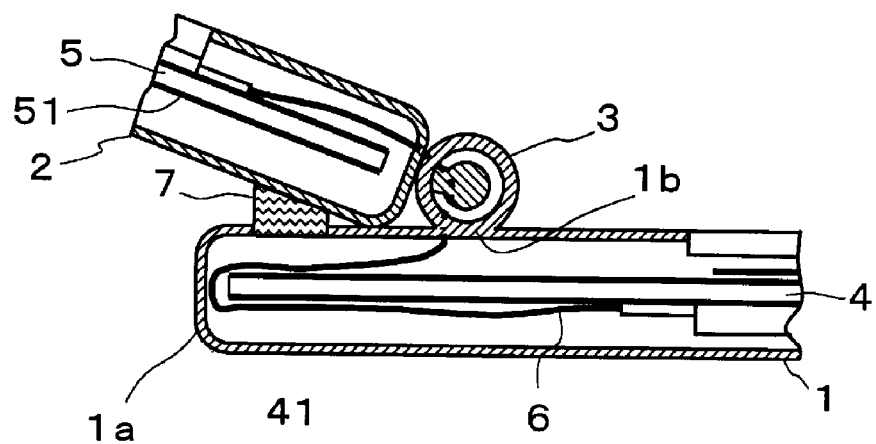
FIG. 12 is a partially enlarged sectional view showing a state in which housings are unfolded.

FIG. 11 is a partially enlarged sectional view showing a main portion of a radio communication apparatus according to the second preferred embodiment of the present invention. FIG. 12 is a partially enlarged sectional view showing a state in which the housings 1 and 2 are unfolded.

The second preferred embodiment differs from the first preferred embodiment described above in terms of a mounting structure for the high dielectric member 7.

That is, as shown in FIG. 11, the high dielectric member 7 is preferably constructed to be a portion of the housing 1, and the high dielectric member 7 is embedded in the housing 1. By unfolding the housings 1 and 2, as shown in FIG. 12, the high dielectric member 7 is caused to be in a state in which the high dielectric member 7 is disposed between the ground areas 41 and 51 of the circuit boards 4 and 5.

With such a structure, a radio communication apparatus can be designed in a state in which the high dielectric member 7 is included, thus the high dielectric member 7 does not affect design of the radio communication apparatus. Here, if a protrusion caused by the high dielectric member 7 is a problem, the high dielectric member 7 may be designed so that the high dielectric member 7 is flush with surfaces of the housings 1 and 2.

Here, the high dielectric member 7 preferably defines a portion of or the entirety of at least one of the housings 1 and 2. Thus, instead of being adhered to the housing 2 as shown in the first preferred embodiment, the high dielectric member 7 may be integrally formed with the housing 2 (the housing 1) when manufacturing the housing 2 (the housing 1). Moreover, the entirety of the housing 2 (the housing 1) may be formed as the high dielectric member 7.

Other structures, operations, and advantages are similar to those of the first preferred embodiment. Thus, a description thereof is omitted.

Preferred Embodiment 3

Next, a third preferred embodiment of the present invention will be described.

Figure 13:
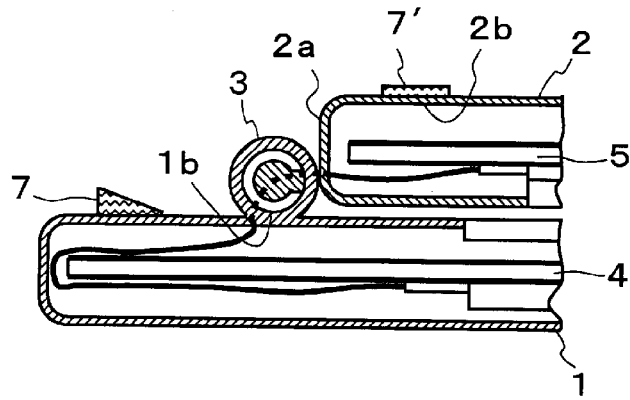
FIG. 13 is a partially enlarged sectional view showing a main portion of a radio communication apparatus according to a third preferred embodiment of the present invention.

FIG. 13 is a partially enlarged sectional view showing a main portion of a radio communication apparatus according to the third preferred embodiment of the present invention.

Figure 14:
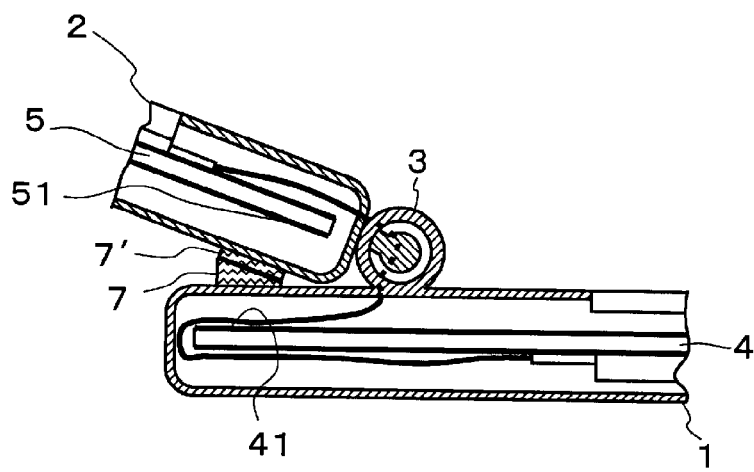
FIG. 14 is a partially enlarged sectional view showing a state in which housings are unfolded.

FIG. 14 is a partially enlarged sectional view showing a state in which the housings 1 and 2 are unfolded.

The third preferred embodiment differs from the first and second preferred embodiments described above in terms of a point that a high dielectric member is provided to both of the housings 1 and 2.

That is, as shown in FIG. 13, a high dielectric member 7' having a rectangular cross-section shape is also arranged to a portion 2b near the end portion 2a of the housing 2 (within the region D2 shown in FIG. 6). By unfolding the housings 1 and 2, as shown in FIG. 14, the high dielectric member 7' overlaps the high dielectric member 7, and the overlapped high dielectric members 7 and 7' are caused to be in a state in which the overlapped high dielectric members 7 and 7' are disposed between the ground areas 41 and 51 of the circuit boards 4 and 5.

With such a structure, the capacitance of a capacitor C (see FIG. 8) between the circuit boards 4 and 5 can be increased, and capacitive coupling between the circuit boards 4 and 5 can be strengthened.

Other structures, operations, and advantages are similar to those of the first and second preferred embodiments. Thus, a description thereof is omitted.

Preferred Embodiment 4

Next, a fourth preferred embodiment of the present invention will be described.

Figure 15:
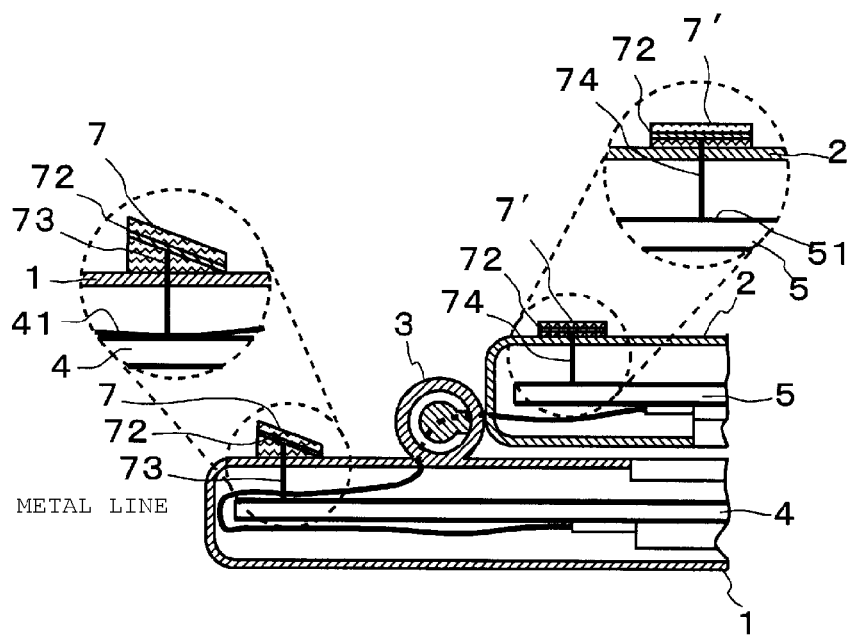
FIG. 15 is a partially enlarged sectional view showing a main portion of a radio communication apparatus according to a fourth preferred embodiment of the present invention.
Figure 16:
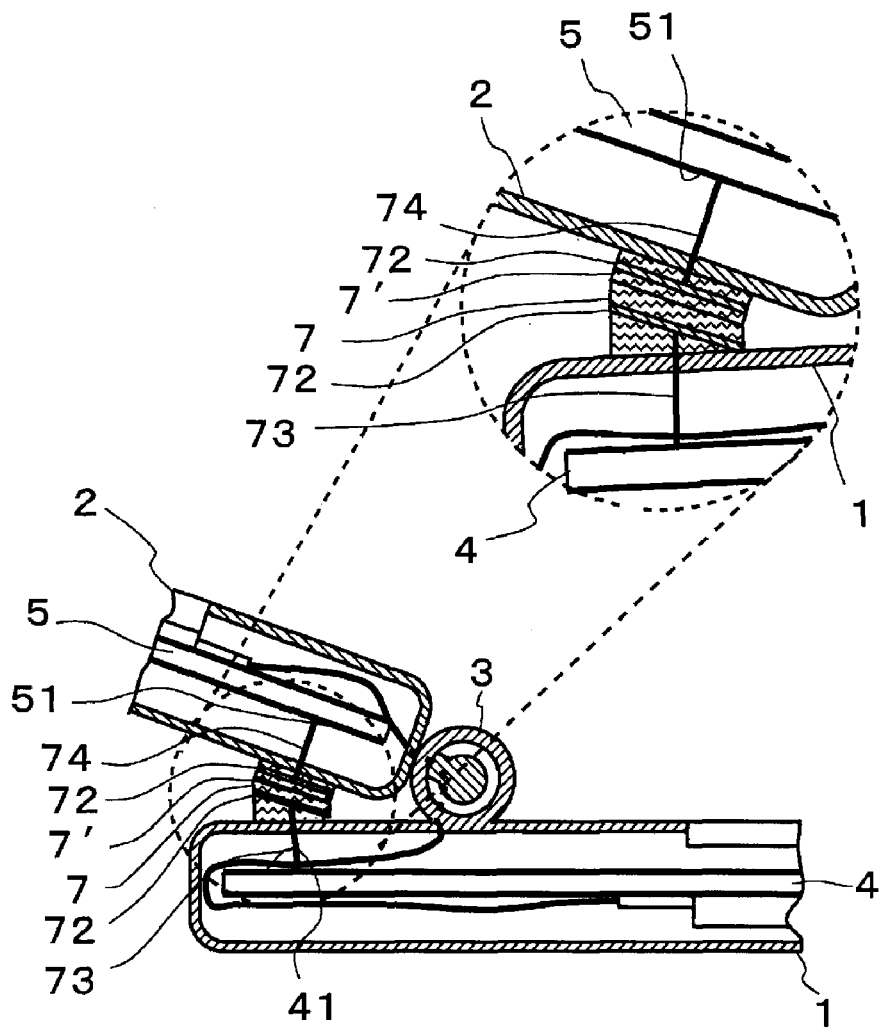
FIG. 16 is a partially enlarged sectional view showing a state in which housings are unfolded.

FIG. 15 is a partially enlarged sectional view showing a main portion of a radio communication apparatus according to the fourth preferred embodiment of the present invention. FIG. 16 is a partially enlarged sectional view showing a state in which the housings 1 and 2 are unfolded.

The fourth preferred embodiment differs from the third preferred embodiment described above in terms of a point that a metal plate inside the high dielectric member is connected to the ground area of the circuit board via a metal line.

That is, as shown in FIG. 15, a metal plate 72 is buried inside the high dielectric member 7 near the housing 1 and another metal plate 72 is buried inside the high dielectric member 7' near the housing 2. A metal line 73 is provided inside the high dielectric member 7, and the metal plate 72 and the ground area 51 of the circuit board 5 are electrically connected via the metal line 73. Also, a metal line 74 is provided inside the high dielectric member 7', and the metal plate 72 and the ground area 41 of the circuit board 4 are electrically connected via the metal line 74.

According to this, unfolding of the housings 1 and 2, as shown in FIG. 16, leads to a state in which the metal plates 72 and 72 are facing each other, the metal plates 72 and 72 being electrically connected to the ground areas 41 and 51 of the circuit boards 4 and 5, and a state in which the high dielectric members 7 and 7' that are in contact are disposed between the circuit boards 4 and 5.

As a result, the capacitance of a capacitor C (see FIG. 8) between the circuit boards 4 and 5 can be increased, and stronger capacitive coupling between the circuit boards 4 and 5 can be generated.

Other structures, operations, and advantages are similar to those of the third preferred embodiment described above. Thus, a description thereof is omitted.

Here, the technical scope of the present invention is not limited to the above-described preferred embodiments, and various modifications are permissible within the scope and spirit of the present invention.

For example, in the first preferred embodiment described above, an example in which the high dielectric member 7 is preferably mounted on the housing 1 by being adhered thereto is given; however, the method of mounting the high dielectric member 7 is not limited to adhering. As a matter of course, various mounting methods which are known may be applied.

In the fourth preferred embodiment described above, an example in which the metal plates 72 are provided inside the high dielectric member 7 near the housing 1 and the high dielectric member 7' near the housing 2, and the metal plates 72 and 72 are electrically connected to the ground areas 41 and 51 of the circuit boards 4 and 5 via the metal lines 73 and 74 is given; however, if the housings 1 and 2 are formed of metal and the housings 1 and 2 are electrically connected to the ground areas 41 and 51 of the circuit boards 4 and 5, operations and advantages similar to those of the fourth preferred embodiment can be obtained by simply disposing the high dielectric member 7 between the housings 1 and 2, as a matter of course.

Moreover, in the preferred embodiments described above, a structure is provided that meets demands in terms of a design in which the dielectric constant of the high dielectric member 7 is preferably set to a value within the range from 5 to 1000, a thickness of or a volume of the high dielectric member 7 is suppressed, and thinning is achieved or protrusions are reduced. However, as a matter of course, a radio communication apparatus in which the dielectric constant of the high dielectric member 7 is set outside the range from 5 to 1000 may be included in the scope of the present invention.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A radio communication apparatus comprising:
a first housing in which a first circuit board including an antenna unit is housed;
a second housing in which a second circuit board is housed;
a hinge unit arranged to connect the first housing and the second housing in an openable/closeable manner;
a group of circuit connecting lines arranged to electrically connect a circuit of the first circuit board and a circuit of the second circuit board and to electrically connect a ground of the first circuit board and a ground of the second circuit board which act as an inductor; and a high dielectric member provided near the hinge unit;
wherein the antenna unit is arranged to be positioned near an end portion opposite the hinge unit of the first circuit board;
the hinge unit connects an end portion of one housing from among the first and second housings and a portion of the other housing, the portion being located farther inside than an end portion of the other housing, and a region extending from the portion of the other housing to the end portion of the other housing overlaps a region near the end portion of the one housing in a projection domain when the first and second housings are in an unfolded state; and
the high dielectric member is arranged to be positioned between the regions overlapped when the first and second housings are in the unfolded state, spaced apart from the hinge unit in order to adjust a capacitance between the ground of the first circuit board and the ground of the second circuit board;
wherein the group of circuit connecting lines and the high dielectric member form a parallel LC circuit; and the electrical lengths of the said first and second circuit boards can be adjusted by controlling the impedance of the parallel circuit while keeping the lengths of the first and second circuit boards constant.

2. The radio communication apparatus according to claim 1, wherein the high dielectric member is provided in at least one of the region extending from the portion of the other housing to the end portion of the other housing and the region near the end portion of the one housing.

3. The radio communication apparatus according to claim 1, wherein the high dielectric member defines a portion of at least one housing from among the first and second housings.

4. The radio communication apparatus according to claim 1, wherein the high dielectric member is a mixture of a thermoplastic resin with a dielectric constant lower than that of a versatile plastic and filler with a high dielectric constant.

5. The radio communication apparatus according to claim 1, wherein a dielectric constant of the high dielectric member is within a range from 5 to 1000.

6. The radio communication apparatus according to claim 1, wherein the high dielectric member is provided in each of the region extending from the portion of the other housing to the end portion of the other housing and the region near the end portion of the one housing, and metal plates are arranged inside the respective high dielectric members that are paired and the metal plates face each other.

7. The radio communication apparatus according to claim 6, wherein each of the metal plates is electrically connected, via a metal line, to the ground of the circuit board inside a housing in which a high dielectric member having the metal plate is provided.

* * * * *